(12) United States Patent
Yang et al.

(10) Patent No.: US 6,717,978 B1
(45) Date of Patent: Apr. 6, 2004

(54) METHOD AND APPARATUS FOR SYSTEM TIME ALIGNMENT

(75) Inventors: Roy Xun Yang, Buffalo Grove, IL (US); Stefan Paun, Park Ridge, IL (US); Jiangnan Jason Chen, Darien, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/575,923

(22) Filed: May 23, 2000

(51) Int. Cl.$^7$ ................ H04B 1/69; H04J 3/06
(52) U.S. Cl. ................ 375/150; 370/335
(58) Field of Search ............... 375/150, 134, 375/137, 145, 149, 326, 354, 355

(56) References Cited

U.S. PATENT DOCUMENTS

| | | | | |
|---|---|---|---|---|
| 6,151,311 A | * | 11/2000 | Wheatley et al. | ............ 370/335 |
| 6,332,008 B1 | * | 12/2001 | Giallorenzi et al. | ........ 375/356 |
| 6,639,907 B2 | * | 10/2003 | Neufeld et al. | ............. 370/342 |

* cited by examiner

Primary Examiner—Stephen Chin
Assistant Examiner—Lawrence Williams
(74) Attorney, Agent, or Firm—Steven A. May

(57) ABSTRACT

A method and apparatus for system time alignment is provided. The method and apparatus for a system time alignment provides synchronization between system components even when one or more system components remains in a quiescent mode for an extended period of time. Compensation for changes in propagation delay between system components is provided, even when such changes in propagation delay occur while one or more system components is in a quiescent mode. A searcher (402) searches a raw data signal for a maximal energy, and a shifter (403) shifts a spreading sequence a plurality of times. An accumulator (408) accumulates a plurality of sets of symbols to produce a plurality of symbol energies. A time offset calculator (410) calculates an updated time offset value and an updated system time value and updates a reference position counter (202) and a system time counter (205), respectively, with these values.

20 Claims, 7 Drawing Sheets

METHOD AND APPARATUS FOR SYSTEM TIME ALIGNMENT

FIELD OF THE INVENTION

The invention relates generally to wireless communication systems and, more particularly, to techniques for maintaining synchronization of components within wireless communication systems.

BACKGROUND OF THE INVENTION

In the past, communication systems used analog technology that did not require precise synchronization between system components, such as a base station and a mobile unit. However, modem communication systems often use modulation techniques, for example code division multiple access (CDMA), that require precise synchronization to allow demodulation of a signal being communicated between the components. In fact, synchronization requirements are often stringent enough that even propagation delays caused by movement of a mobile unit relative to a base station may require resynchronization. While such resynchronization may be performed incrementally while a mobile unit is moving relative to a base station, such resynchronization requires active processing to occur within the mobile unit.

In an effort to extend the battery life of mobile units, mobile units are often deactivated and placed in a dormant, or a quiescent, mode to reduce power consumption and extend battery life. However, when the mobile unit is in a quiescent mode, the active processing that is used during the active mode to maintain synchronization between a base station and the mobile unit is not available. The propagation delay between the base station and the mobile unit may change enough that the traditional technique for resynchronizing the mobile with the base station may be less effective.

FIG. 1 is a diagram illustrating a relationship between a base station and a mobile unit as the mobile unit moves relative to the base station. The horizontal axis denotes time, while the vertical axis denotes energy. At a time TSYS, denoted by impulse 101, if the base station transmits a signal, that signal will not be received by the mobile unit until after a propagation delay 106, illustrated as OFFSET1, has elapsed. After OFFSET1 has elapsed, the mobile unit receives the signal at time TMOBILE1, as denoted by impulse 102. In a real world environment, the signal is affected by reflections and other physical phenomena that cause various components of the signal to arrive at different time offsets, resulting in energy envelope 104, which is spread over a period of time proximate to TMOBILE1 and having its maximal energy at time TMOBILE1.

However, if the mobile unit is placed in a quiescent mode and transported relative to the base station such that the propagation delay between the base station and the mobile unit increases, the time offset between the time at the base station and the time at the mobile unit increases, and the propagation delay 107 is represented as time delay OFFSET2. Thus, after the mobile unit leaves the quiescent mode, the mobile unit receives the signal at time TMOBILE2, as illustrated by impulse 103. As described previously, physical phenomena cause the energy of the signal to be spread over a period of time proximate to time TMOBILE2, denoted by energy envelope 105. While a mobile unit using prior art technology is in the quiescent mode, it is unable to track the change in propagation delay and configure the mobile unit to operate using time delay OFFSET2 rather than time delay OFFSET1. Thus, a mobile unit using prior art technology is not resynchronized after a period of time in the quiescent mode without reacquiring the system.

FIG. 2 is a block diagram illustrating a prior art technique for maintaining synchronization in a mobile unit. A plurality of receiver fingers, including FINGER0, FINGER1, FINGER2, and FINGER3, provide outputs to a multiplexer 201. A FINGERSELECT signal is also provided to multiplexer 201. An output for multiplexer 201 is provided to adder 203. A reference position counter 202 provides an output that is applied as a negative input to adder 203, causing adder 203 to subtract the output of reference position counter 202 from the output of multiplexer 201. The output of adder 203 is provided to clock adjust logic block 204. Clock adjust logic block 204 provides a reference position counter adjustment output to reference position counter 202 in a system time counter adjustment output to system time counter 205. Thus, system time counter 205 is adjusted to provide an output SYS_CNT that is adjusted according to the receiver finger outputs provided to multiplexer 201. However, to maintain synchronization after waking up from the quiescent mode, the entire receiver circuit of FIG. 2 needs to be active. This requires that the receiver fingers, as well as multiplexer 201, reference position counter 202, adder 203, clock adjust logic block 204, and system time counter 205 all remain in an active mode. Thus, all of those elements continue to consume power, thereby defeating the desired benefits of a quiescent mode.

Thus, a more effective technique is needed to maintain synchronization of system components even while one or more system components is in a quiescent mode.

DETAILED DESCRIPTION OF A PREFERRED EMBODIMENT

A method and apparatus for system time alignment is provided. The method and apparatus for a system time alignment provides synchronization between system components even when one or more system components remains in a quiescent mode for an extended period of time. Compensation for changes in propagation delay between system components is provided, even when such changes in propagation delay occur while one or more system components is in a quiescent mode. An embodiment of the invention utilizes a signal from a system component that includes timing information. For example a quick paging channel, such as that implemented under IS95-C, maybe used to obtain the timing information. The quick paging channel of IS95-C is as a common Walsh code $W_{16}^{64}$ and is available to all mobile units in the same sector. The quick paging channel contains a single bit message to direct a mobile unit to monitor its assigned time slot on a paging channel. The quick paging channel does not require error correction, interleaving, or long code scrambling to communicate such single bit messages.

Figure 1:
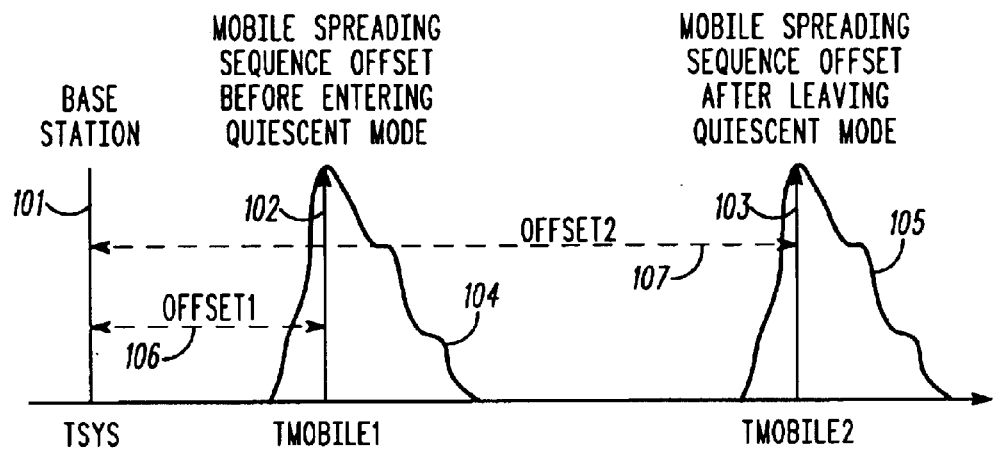
FIG. 1 is a diagram illustrating a relationship between a base station and a mobile unit as the mobile unit moves relative to the base station.
Figure 2:
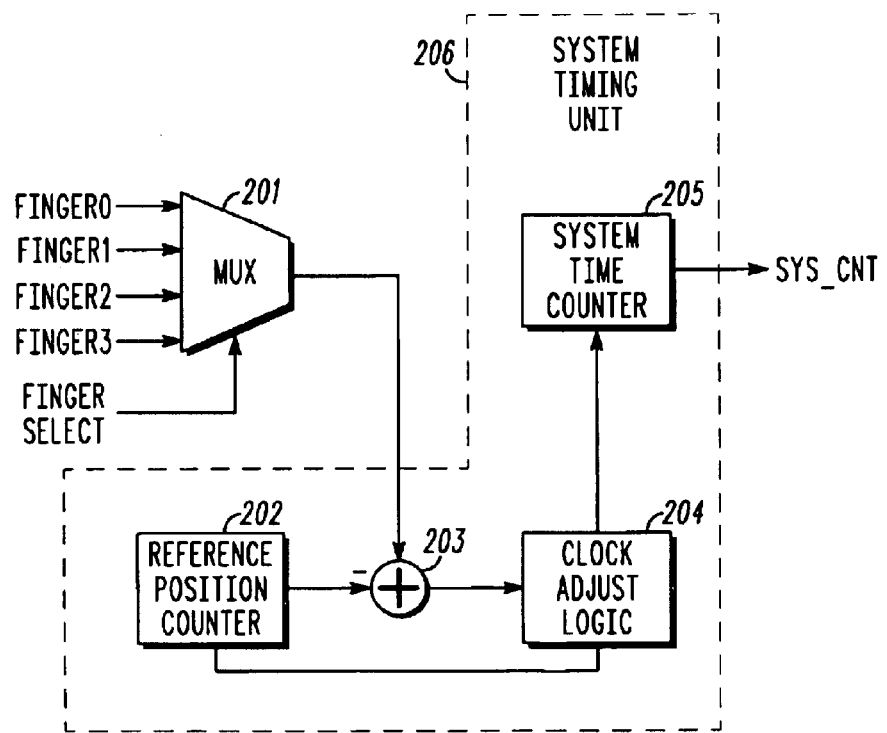
FIG. 2 is a block diagram illustrating a prior art technique for maintaining synchronization in a mobile unit.
Figure 3:
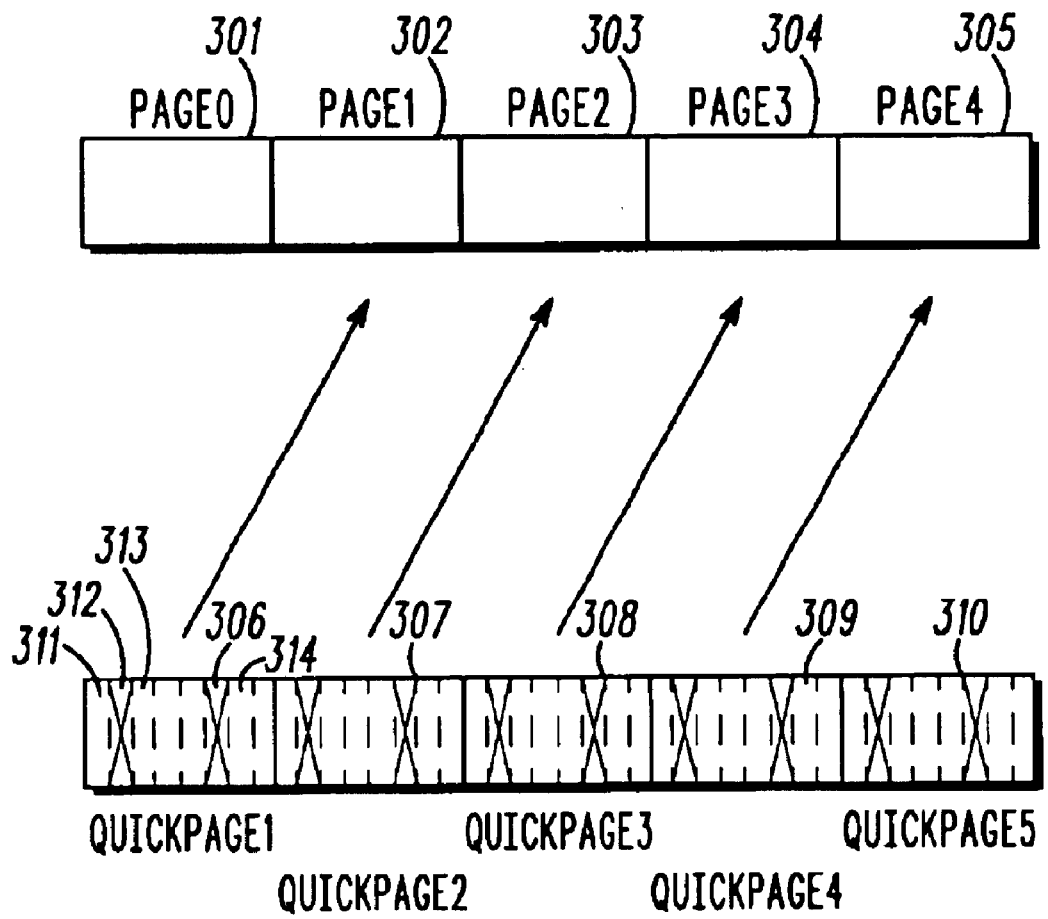
FIG. 3 is a timing diagram illustrating a relationship between a quick paging channel and a regular paging channel.

FIG. 3 is a timing diagram illustrating a relationship between a quick paging channel and a regular paging channel. The quick paging channel comprises time slots 306, 307, 308, 309, and 310. The regular paging channel comprises time slots 301, 302, 303, 304, and 305. A quick paging channel time slot runs one slot (e.g., 20 ms) ahead of the regular paging channel time slot to which it corresponds. For example, quick paging channel time slots 306, 307, 308, and 309 correspond to regular paging channel slots 302, 303, 304, and 305, respectively. Regular paging channel time slot 301 corresponds to a quick paging channel time slot that proceeds quick paging channel time slot 306, and quick paging channel time slot 310 corresponds to a regular paging channel time slot that follows regular paging channel time slot 305. The location of a quick paging channel time slot can be determined by subtracting 1 from the value obtained from a regular paging channel time slot hash function.

Each quick paging channel time slot includes flag bits to indicate whether a mobile unit should expect to receive information during its corresponding regular paging channel time slot and should enter an active mode to enable it to do so. The flag bits in each quick paging channel time slot are located at pre-determined positions relative to the start of the time slot. The flag bit is repeated at a later position in each time slot to provide redundancy. Both positions of the flag bits within the quick paging channel time slot are determined using a hash function. The offset between the flag bits in each quick paging channel slot is preferably constant for all quick paging channel slots. The positions of the flag bits within the quick paging channel time slots can be used to identify the quick paging channel time slots.

Quick paging channel time slot 306 includes a number of possible positions of the flag bits. These possible positions include 311, 312, 313, and 314. As can be seen from FIG. 3, a flag bit is located at position 313 and repeated at position 314.

While prior art techniques were able to synchronize a mobile unit with a base station using the regular paging channel, the prior art techniques did not use the quick paging channel. Consequently, the prior art techniques required complicated clock circuitry to attempt to predict the wake up time. However, even such complicated clock circuitry was subject to failure in its attempts at prediction of the wake up time. In the event of such a failure, a cumbersome boot up process was required to reacquire the system time.

The present invention avoids the disadvantages of the prior art. In accordance with the present invention, a method and apparatus are provided that are capable of utilizing timing information of the quick paging channel to allow simplification of circuitry and increased reliability for maintaining synchronization.

To save power, a system component, such as a mobile unit, can remain in a quiescent mode most of the time that it is not actually in use. However, it is important for the system component to maintain synchronization with another system component, such as a base station, during the time that the first system component is in the quiescent mode, so that when the first system component is returned to an active mode, it is able to communicate with the second system component. Since convolution decoding and de-interleaving are not required to interpret the quick paging channel, the quick paging channel can be used to obtain timing information needed to maintain synchronization between the system components since it requires less circuitry to be activated to calculate a time offset compared to the circuitry needed to interpret a paging channel. Additionally, since a quick paging channel is a continuous channel, a system component obtaining timing information from the quick paging channel may do so at any time, without regard to a specific quick paging channel time slot assigned to that system component.

Figure 4:
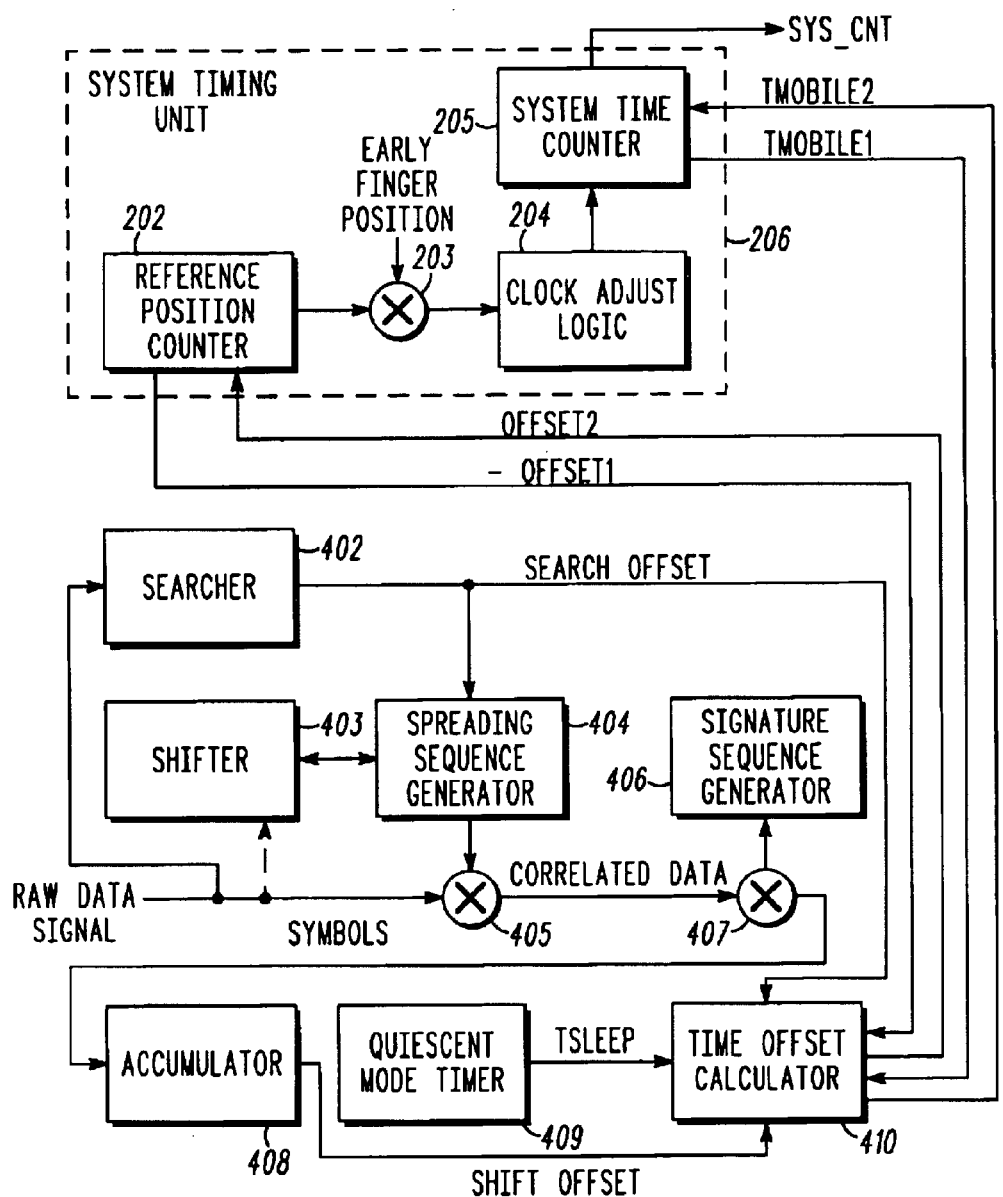
FIG. 4 is a block diagram illustrating apparatus in accordance with an embodiment of the invention.

FIG. 4 is a block diagram illustrating apparatus in accordance with an embodiment of the invention. A raw data signal is provided to a searcher 402 and a multiplier 405. The searcher determines a search offset and provides the search offset to spreading sequence generator 404 and time offset calculator 410. Spreading sequence generator 404 generates a spreading sequence. Shifter 403 is coupled to spreading sequence generator 404 and shifts the spreading sequence a plurality of times by a given time increment to produce a plurality of shifted spreading sequences. The plurality of shifted spreading sequences are provided to multiplier 405. Multiplier 405 multiplies the plurality of shifted spreading sequences by the raw data signal to produce a plurality of sets of correlated data. The plurality of sets of correlated data are provided to multiplier 407. Signature sequence generator 406 generates a signature sequence and provides the signature sequence to multiplier 407. Multiplier 407 multiplies the signature sequence by the plurality of sets of correlated data to produce a plurality of symbols.

The plurality of symbols are provided to accumulator 408. Accumulator 408 accumulates the plurality of symbols to produce a plurality of sets of accumulated symbol energies. The plurality of sets of accumulated symbol energies are compared to determine a shift offset corresponding to an accumulated symbol energy having a maximal symbol energy. The shift offset is provided to time offset calculator 410. A quiescent mode timer 409 generates a TSLEEP signal indicative of the duration of the quiescent mode and communicates the TSLEEP signal to time offset calculator 410.

Time offset calculator 410 is coupled to a system timing unit 206. The system timing unit 206 comprises reference position counter 202, adder 203, clock adjust logic block 204, and system time counter 205. Reference position counter 202 provides a negative value of OFFSET1, denoted as –OFFSET1, to time offset calculator 410. System time counter 205 provides a value TMOBILE1 to time offset calculator 410. Once time offset calculator 410 has received –OFFSET1 and TMOBILE1, system timing unit 206 maybe placed in a quiescent mode. System timing unit 206 and the remainder of the circuitry in the system component in which the circuits of FIG. 4 are incorporated may be placed in a quiescent mode to maximize power saving and extend battery life.

While most of the system component is in the quiescent mode, searcher 402, shifter 403, spreading sequence generator 404, multiplier 405, signature sequence generator 406, multiplier 407, accumulator 408, quiescent mode timer 409, and time offset calculator 410 derive timing information from the raw data signal to provide an updated time offset value and an updated system time value. When the circuits of system timing unit 206 are reactivated, time offset calculator 410 provides the updated time offset value OFF- SET2 to reference position counter 202 and the updated system time value TMOBILE2 to system time counter 205. With the updated time offset value provided to reference position counter 202 and the updated system time value provided to system time counter 205, system time counter 205 provides output SYS_CNT that is synchronized with other system components.

Figure 5:
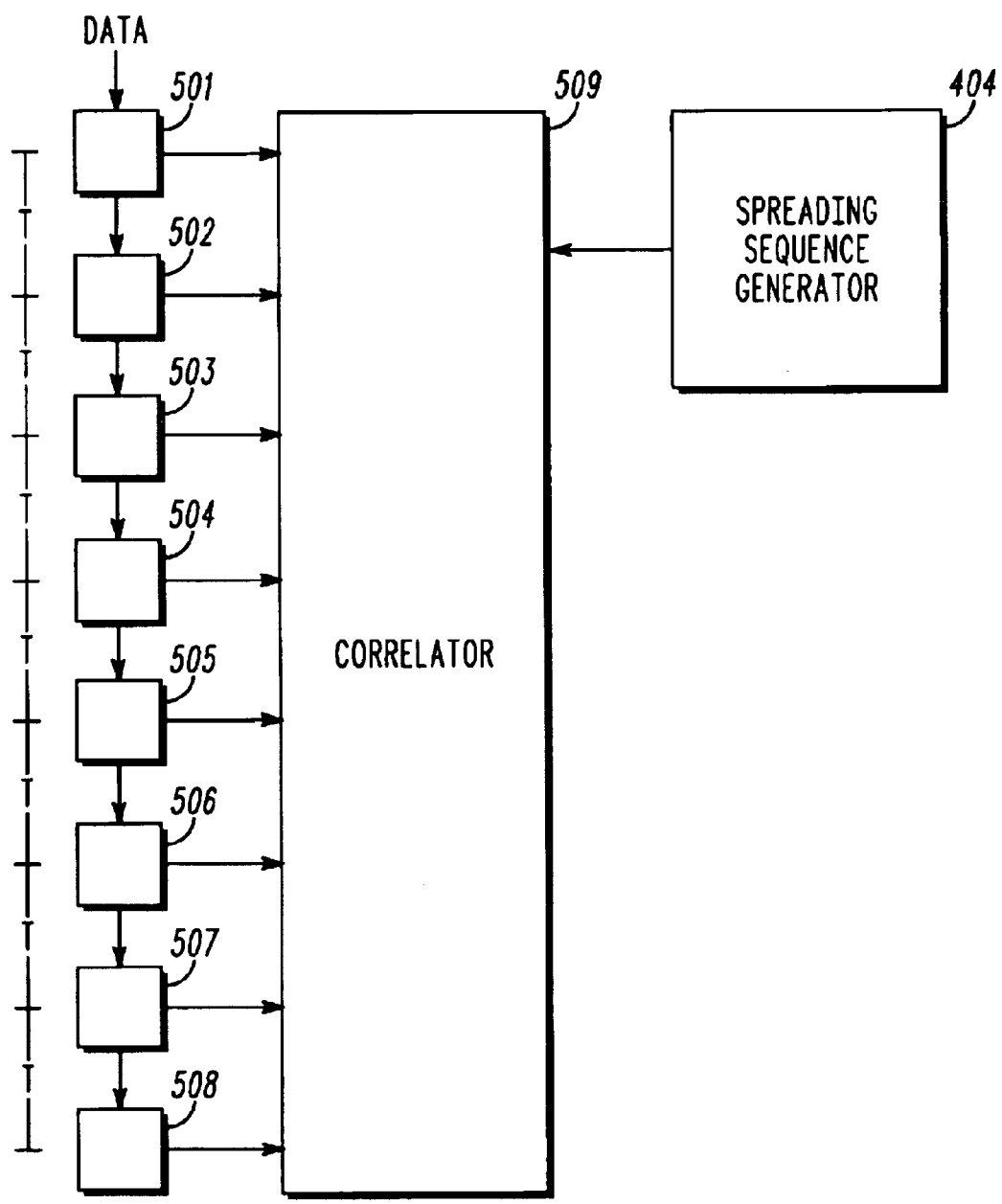
FIG. 5 is a block diagram illustrating an example of shifter 403 in accordance with an embodiment of the invention.

FIG. 5 is a block diagram illustrating an example of shifter 403 in accordance with an embodiment of the invention. Shifter 403 maybe implemented using a plurality of cells 501, 502, 503, 504, 505, 506, 507, and 508. The raw data signal is shifted through the cells such that the portion of the raw data signal provided to correlator 509 from each of the cells is shifted by a time T relative to the proceeding cell. The time T may be a very small increment of time, for example $\frac{1}{8}^{th}$ chip. Correlator 509 receives a spreading sequence from spreading sequence generator 404 and correlates the spreading sequence with the shifted raw data signal received from cells 501, 502, 503, 504, 505, 506, 507, and 508. The correlator 509 provides a plurality of sets of correlated data based on the shifted raw data signals received from the cells.

Alternatively, the shifter 403 maybe implemented using a plurality of cells to shift the spreading sequence received from spreading generator 404, with the plurality of shifted spreading sequences applied to correlator 509. In that case, correlator 509 correlates the raw data signal with the plurality of shifted spreading sequences to produce a plurality of sets of correlated data.

Figure 6:
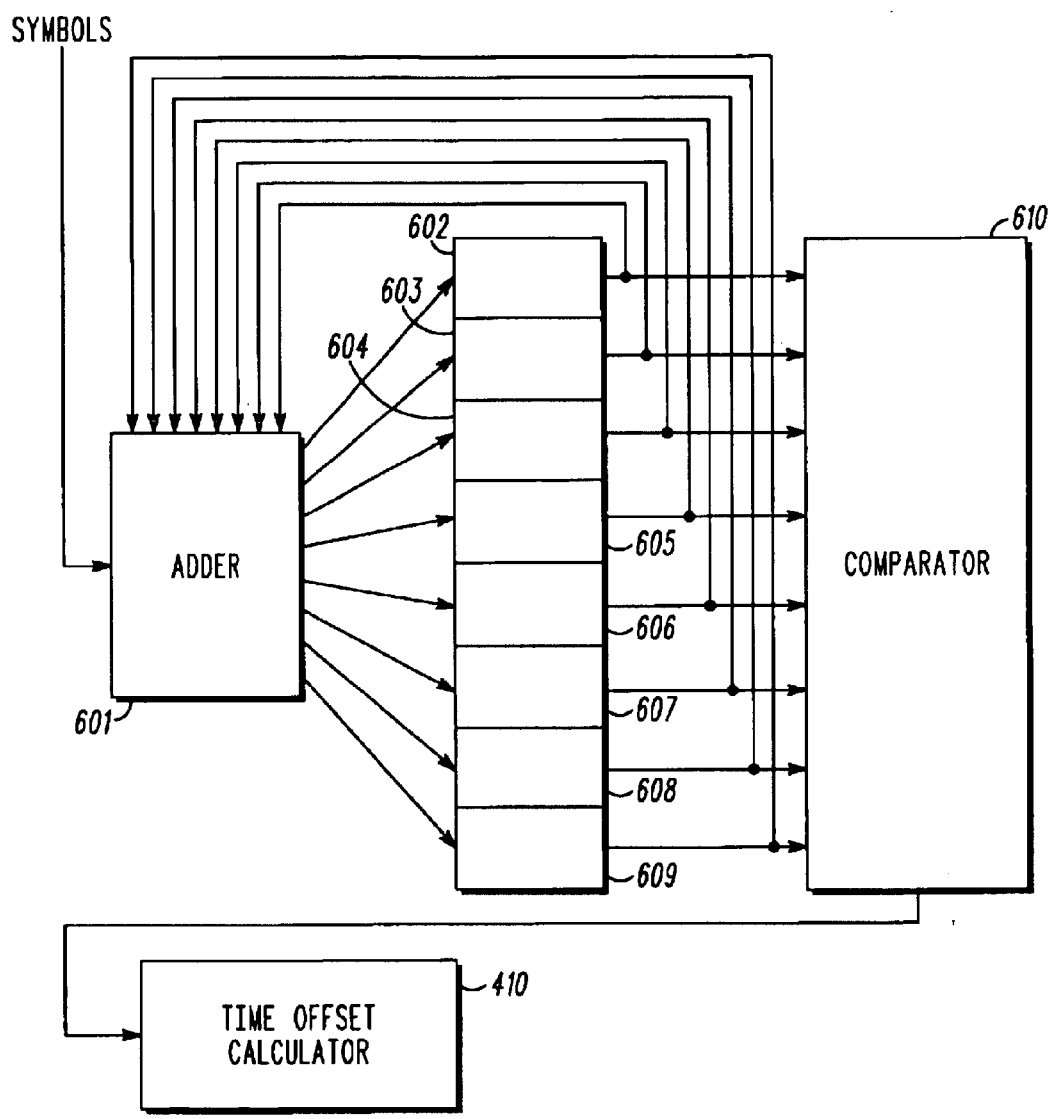
FIG. 6 is a block diagram illustrating an example of accumulator 408 in accordance with an embodiment of the invention.

FIG. 6 is a block diagram illustrating an example of accumulator 408 in accordance with an embodiment of the invention. Symbols are provided to adder 601. Adder 601 stores the symbols in a plurality of registers 602, 603, 604, 605, 606, 607, 608, and 609. These symbols from these registers are provided to comparator 610 and back to adder 601. Adder 601 combines the incoming symbols with their respective stored symbols from registers 602–609 so as to accumulate the symbols over time, producing a plurality of accumulated symbol energies. Comparator 610 compares the plurality of accumulated symbol energies to determine a shift offset corresponding to an accumulated symbol energy having a maximal symbol energy. Comparator 610 provides the shift offset to time offset calculator 410.

Figure 7:
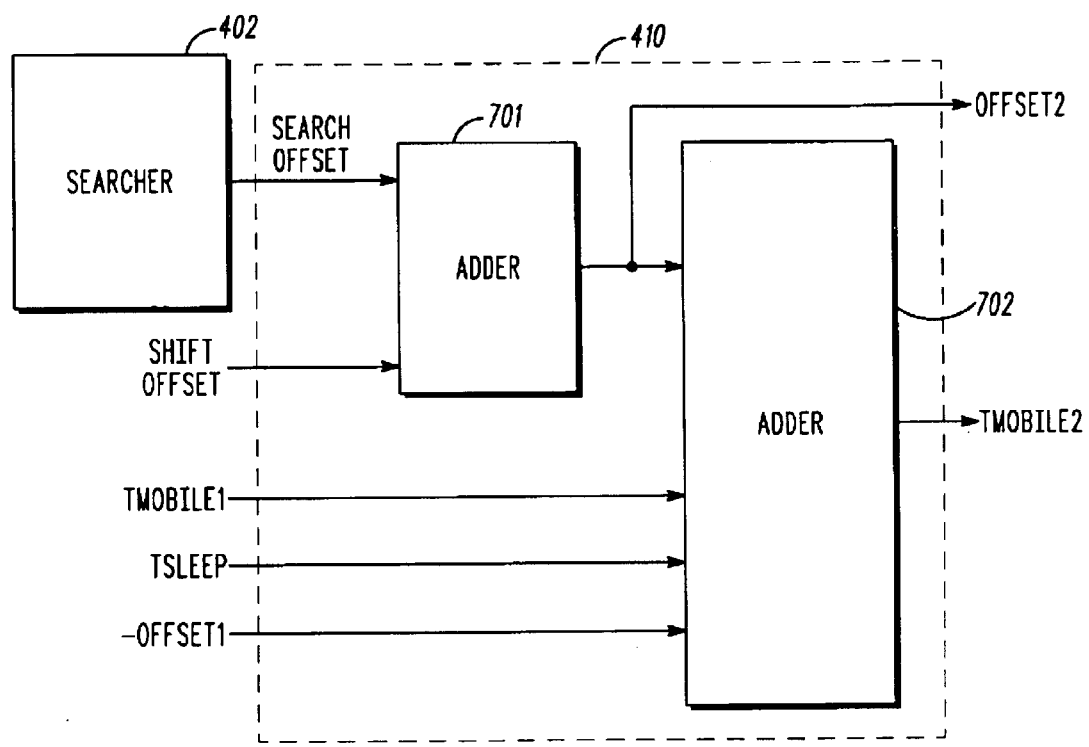
FIG. 7 is a block diagram illustrating an example of time offset calculator 410 in accordance with an embodiment of the invention.

FIG. 7 is a block diagram illustrating an example of time offset calculator 410 in accordance with an embodiment of the invention. Time offset calculator 410 comprises adder 701 and adder 702. Searcher 402 provides a search offset to adder 701. Accumulator 408 provides a shift offset to adder 701. Adder 701 adds the search offset and the shift offset to produce an updated time offset value OFFSET2 and provides the updated time offset value OFFSET2 to adder 702. Adder 702 receives a system time value TMOBILE1 from system time counter 205, a negative =time offset value −OFFSET1 from reference position counter 202, and a time TSLEEP from quiescent mode timer 409. Adder 702 combines OFFSET2, TMOBILE1, TSLEEP, and −OFFSET1 to produce an updated system time value TMOBILE2 according to the equation TMOBILE2=TMOBILE1−OFFSET1+TSLEEP+OFFSET2.

Figure 8:
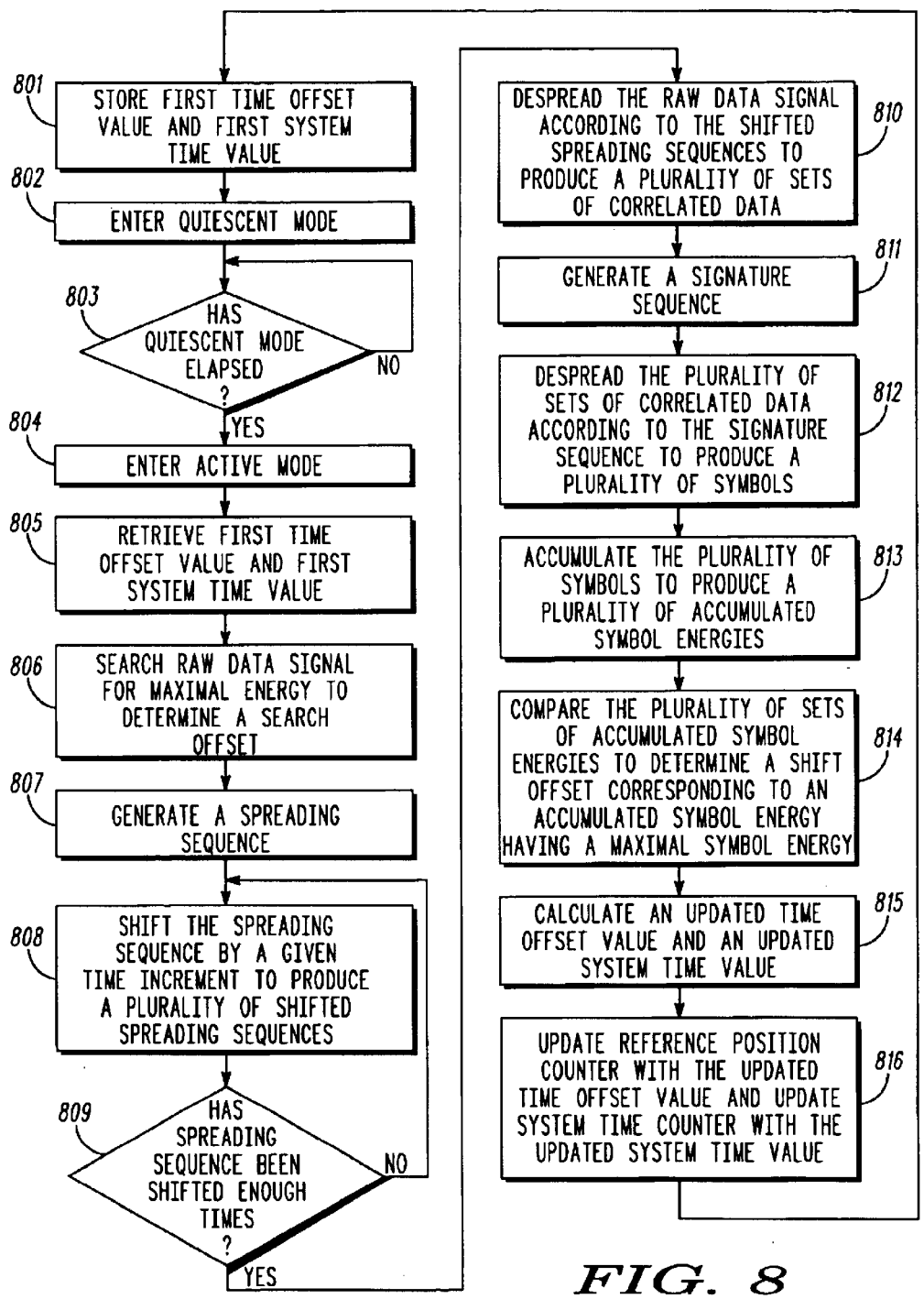
FIG. 8 is a flow diagram illustrating a process in accordance with an embodiment of the invention.

FIG. 8 is a flow diagram illustrating a process in accordance with an embodiment of the invention. In step 801, the process stores a first time offset value in a first system time value. In step 802, the process causes the system component to enter a quiescent mode. In step 803, a decision is made as to whether or not the quiescent mode has elapsed. If the quiescent mode has not elapsed, the process returns to step 803. If the quiescent mode has elapsed, the process continues to step 804. In step 804, the process enters an active mode after the quiescent mode has elapsed.

In step 805, the process retrieves a first time offset value and a first system time value. In step 806, the process searches a raw data signal for a maximal energy to determine a search offset. In step 807, the process generates a spreading sequence. In step 808, the process shifts the spreading sequence a plurality of times by a given time increment to produce a plurality of shifted spreading sequences. In step 809, a decision is made as to whether or not the spreading sequence has been shifted enough times. If the spreading sequence has not been shifted enough times, the process returns to step 808. If the spreading sequence has been shifted enough times, the process continues to step 810. In step 810, the process de-spreads the raw data signal according to the shifted spreading sequences to produce a plurality of sets of correlated data. In step 811, the process generates a signature sequence. In step 812, the process de-spreads the plurality of sets of correlated data according to the signature sequence to produce a plurality of symbols.

In step 813, the process accumulates the plurality of symbols to produce a plurality of accumulated symbol energies. In step 814, the process compares the plurality of sets of accumulated symbol energies to determine a shift offset corresponding to an accumulated symbol energy having a maximal symbol energy.

In step 815, the process calculates an updated time offset value and an system time value. The process calculates the updated time offset value in the updated system time value from the search offset, the shift offset, the first time offset value, the first system time value, and the quiescent mode time. In step 816, the process updates the reference position counter with the updated time offset value and updates the system time counter with the updated system time value. From step 816, the process returns to step 801.

Before entering the quiescent mode, the system component remembers the first time offset value and the first system time value received from system timing unit 206. The system component adjusts its system time to a base station time TSYS by subtracting OFFSET1 from TMOBILE1 (or, equivalently, adding −OFFSET and TMOBILE1). The system component calculates the next time slot at which it is scheduled to enter the active mode and determines a number of iterations of the spreading sequence that will elapse while it is in the quiescent mode. At the time when the system component is scheduled to enter the active mode, searcher 402 searches for a maximal energy in the vicinity of the time that the system component is scheduled to enter the active mode using the number of iterations of the spreading sequence with one half chip resolution. The maximal energy identified by the searcher is used to program spreading sequence generator 404 to produce a spreading sequence having correct alignment within one half chip resolution. Shifter 403 aligns the spreading sequence in ⅛ chip increments to produce a plurality (e.g., 8) sets of correlated data.

After the plurality of sets of correlated data are correlated with a signature sequence using signature sequence generator 406 and multiplier 407, the resulting symbols are accumulated over a period of time (e.g., 128 chips) and the maximum accumulated symbol energy is used by the time offset calculator 410 as a fine spreading sequence offset having a resolution of $\frac{1}{8}^{th}$ chip. Combining the search offset from searcher 402 and the shift offset from accumulator 408, time offset calculator 410 determines an updated time offset value OFFSET2. The time offset calculator 410 uses the updated time offset value OFFSET2 to determine an updated system time value TMOBILE2. The time offset calculator 410 updates reference position counter 202 with the updated time offset value OFFSET2 and the system time counter 205 with the updated system time value TMOBILE2.

The invention provides several advantages over the prior art techniques. For example the invention may be used to provide better time alignment than is possible using prior art techniques. For example, time alignment may be provided with a resolution of $\frac{1}{8}^{th}$ chip as compared to one half chip. By providing better time alignment, the invention also provides better correlator alignment, which temporarily results in better receiver sensitivity. By providing better time alignment at the time the system component enters the quiescent mode, the invention extends the amount of time that the system component may remain in the quiescent mode before resynchronizing with other system components. By maximizing the amount of time the system component may remain in the quiescent mode, the invention further reduces power consumption and extends battery life.

Another advantage of the invention is that it allows time alignment using a searcher plus de-spreader circuitry. All other parts of the receiver circuitry, including the combiner, de-interleaver, and decoder, do not need to be activated. By reducing the number of receiver circuits that need to be activated, the invention further reduces power consumption and extends battery life.

Another advantage of the invention is that it allows time alignment to occur at any time. Time alignment is not required to occur within a particular time slot, since any time slot maybe used to obtain the timing information. Other advantages will also be apparent to those of ordinary skill in the art.

Accordingly, a method and apparatus for providing system time alignment has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for system time alignment comprising the steps of:
   shifting a spreading sequence a plurality of times by a given time increment to produce a plurality of shifted spreading sequences;
   despreading a raw data signal according to the shifted spreading sequences to produce a plurality of sets of correlated data;
   a signature sequence despreader that produces a plurality of symbols based on the plurality of sets of correlated data;
   comparing a plurality of sets of accumulated symbol energies to determine a shift offset corresponding to an accumulated symbol energy having a maximal symbol energy;
   calculating an updated time offset value and an updated system time value; and
   updating a reference position counter with the updated time offset value and updating a system time counter with the updated system time value.

2. The method of claim 1 farther including:
   storing a first time offset value and a first system time value; and
   retrieving the first time offset value and the first system time value.

3. The method of claim 2 further including:
   accumulating a plurality of symbols to produce the plurality of accumulated symbol energies.

4. The method of claim 3 further including:
   entering a quiescent mode; and
   entering an active mode after a quiescent mode time has elapsed.

5. The method of claim 4 further including:
   generating a spreading sequence;
   generating a signature sequence; and
   despreading the plurality of sets of correlated data according to the signature sequence to produce the plurality of symbols.

6. The method of claim 5 further including:
   searching the raw data signal for a maximal energy to determine a search offset.

7. The method of claim 6 wherein the step of calculating a updated time offset value and a updated system time value includes the step of:
   calculating a updated time offset value and a updated system time value from the search offset, the shift offset, the first time offset value, the first system time value, and the quiescent mode time.

8. An apparatus for system time alignment comprising:
   a shifter that shifts a spreading sequence a plurality of times by a given time increment to produce a plurality of shifted spreading sequences; and
   a spreading sequence despreader that despreads a raw data signal based on the plurality of shifted spreading sequences to produce a plurality of sets of correlated data;
   a signature sequence despreader that produces a plurality of symbols based on the plurality of sets of correlated data;
   an accumulator that determines a shift offset based on the plurality of symbols;
   a time offset calculator that receives the shift offset and calculates an updated time offset value and an updated system time value; and
   wherein the undated time offset value can be used to update a reference position counter and the updated system time value can be used to update a system time counter.

9. The apparatus of claim 8 wherein the accumulator accumulates the plurality of symbols, produces a plurality of sets of accumulated symbol energies based on the accumulated plurality of symbols, and determines a shift offset based on the plurality of symbol energies.

10. The apparatus of claim 9 wherein the accumulator compares the plurality of sets of accumulated symbol energies to determine the shift offset.

11. The apparatus of claim 10 wherein the shift offset is determined as corresponding to an accumulated symbol energy having a maximal symbol energy.

12. The apparatus of claim 8 further including:
    a spreading sequence generator operatively coupled to the shifter to generate the spreading sequence.

13. The apparatus of claim 8 wherein the signature sequence despreader despreads the plurality of sets of correlated data according to a signature sequence to produce the plurality of symbols.

14. The apparatus of claim 13 further including:

a signature sequence generator operatively coupled to the signature sequence despreader to generate the signature sequence.

15. The apparatus of claim 13 further including:

a searcher operatively coupled to the time offset calculator to search the raw data signal for a maximal energy to determine a search offset.

16. The apparatus of claim 8 wherein the time offset calculator updates a reference position counter with the updated time offset value and updates a system time counter with the updated system time value.

17. The apparatus of claim 8 further including:

a quiescent mode timer operatively coupled to the time offset calculator to cause the apparatus to enter an active mode after a quiescent mode time has elapsed.

18. The apparatus of claim 17 wherein the apparatus remains in a quiescent mode before the quiescent mode time has elapsed.

19. The apparatus of claim 8 wherein the time offset calculator includes a first time offset value storage device to store a first time offset value and a first system time value storage device to store a first system time value.

20. The apparatus of claim 19 wherein the time offset calculator retrieves the first time offset value from the first time offset value storage device and retrieves the first system time value from the first system time value storage device.

* * * * *